US009025554B2

(12) United States Patent
Sato et al.

(10) Patent No.: US 9,025,554 B2
(45) Date of Patent: *May 5, 2015

(54) WIRELESS BASE STATION AND WIRELESS COMMUNICATION METHOD

(75) Inventors: Yoshizo Sato, Daito (JP); Masaaki Nakata, Yamato (JP); Nobuaki Takamatsu, Koto-ku (JP); Masahiro Yagi, Kawasaki (JP); Hiroki Fujita, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 14 days.

This patent is subject to a terminal disclaimer.

(21) Appl. No.: 13/814,334

(22) PCT Filed: Aug. 4, 2011

(86) PCT No.: PCT/JP2011/067885
§ 371 (c)(1),
(2), (4) Date: Mar. 5, 2013

(87) PCT Pub. No.: WO2012/018088
PCT Pub. Date: Feb. 9, 2012

(65) Prior Publication Data
US 2013/0215847 A1 Aug. 22, 2013

(30) Foreign Application Priority Data

Aug. 6, 2010 (JP) ................................ 2010-178135

(51) Int. Cl.
*H04W 72/04* (2009.01)
*H04L 5/00* (2006.01)
(Continued)

(52) U.S. Cl.
CPC ........... *H04W 72/042* (2013.01); *H04L 5/0051* (2013.01); *H04L 25/0212* (2013.01);
(Continued)

(58) Field of Classification Search
CPC ............ H04W 72/042; H04W 5/0051; H04W 25/0212–25/0224; H04W 16/28; H04W 88/08; H04W 56/00; H04W 28/00; H04B 7/0617; H04L 1/1854
USPC ......... 370/247–248, 252, 310, 312, 328–329, 370/332–334, 336–338, 346, 465–470, 491, 370/500, 509; 455/273, 63.7, 422.1, 455/450–451, 452.1, 501, 509, 524, 456.2, 455/557, 463, 562
See application file for complete search history.

(56) References Cited

U.S. PATENT DOCUMENTS

2008/0205364 A1* 8/2008 Park et al. ..................... 370/338
2010/0322115 A1* 12/2010 Wei et al. ..................... 370/280
(Continued)

FOREIGN PATENT DOCUMENTS

CN 101572896 A 11/2009
CN 101615937 A 12/2009
(Continued)

OTHER PUBLICATIONS

"Considerations for Dynamic Aperiodic SRS." Huawei, 3GPP TSG RAN WG1 meeting #61 bis, R1-103897, Dresden, Germany, Jun. 28, 2010.
(Continued)

*Primary Examiner* — Charles C Jiang
*Assistant Examiner* — Mohamed Kamara
(74) *Attorney, Agent, or Firm* — Procopio, Cory, Hargreaves & Savitch LLP

(57) ABSTRACT

A transmission path state estimation unit estimates a state of a transmission path to a wireless terminal based on a DRS (Demodulation Reference Signal) included in uplink user data received from the wireless terminal when a re-sending request is received after transmission of an SRS is stopped. A transmission unit forms directivity of a plurality of antennas based on the estimated state of the transmission path and transmits downlink user data.

14 Claims, 15 Drawing Sheets

(51) Int. Cl.
- H04L 25/02 (2006.01)
- H04L 1/18 (2006.01)
- H04W 16/28 (2009.01)
- H04W 88/08 (2009.01)
- H04B 7/06 (2006.01)

(52) U.S. Cl.
CPC .......... *H04L25/0224* (2013.01); *H04W 16/28* (2013.01); *H04W 88/08* (2013.01); *H04B 7/0617* (2013.01); *H04L 1/1854* (2013.01)

(56) References Cited

U.S. PATENT DOCUMENTS

| | | |
|---|---|---|
| 2011/0058505 A1 | 3/2011 | Pan et al. |
| 2012/0063371 A1* | 3/2012 | He et al. ............... 370/280 |
| 2013/0223413 A1* | 8/2013 | Kawamura et al. ........ 370/336 |

FOREIGN PATENT DOCUMENTS

| | | |
|---|---|---|
| CN | 101730298 A | 6/2010 |
| JP | 2010-028192 A | 2/2010 |

OTHER PUBLICATIONS

"Sounding Extension Using DMRS." Huawei, 3GPP TSG RAN WG1 meeting #61, R1-103116, Montreal, Canada, May 10, 2010.
"Impacts of OCC on UL DM RS for LTE-A." Huawei, 3GPP TSG RAN WG1 meeting #60, R1-101075, San Francisco, Feb. 22, 2012.
"SRS Indication for TDD." Samsung, TSG-RAN WG1 #52 bis, R1-081211, Shenzhen, China, Mar. 31, 2008.
International Search Report dated Aug. 30, 2011, issued for International Application No. PCT/JP2011/067885.
Office Action dated Jan. 19, 2015 issued in counterpart Chinese Patent Application No. 2011-80038600.1.

\* cited by examiner

WIRELESS BASE STATION AND WIRELESS COMMUNICATION METHOD

TECHNICAL FIELD

The present invention relates to a wireless base station and a wireless communication method, and particularly to a wireless base station estimating a state of a transmission path based on a sounding signal and a wireless communication method.

BACKGROUND ART

In a wireless communication system adapted to an LTE (Long Term Evolution) scheme or the like, of which specifications have been developed in 3GPP (3rd Generation Partnership Project), a wireless terminal transmits a reference signal to a wireless base station. The wireless base station estimates a state of a transmission path based on the received reference signal and forms antenna directivity for downlink user data.

As a method of transmitting a reference signal, such a method that a wireless terminal transmits an SRS (Sounding Reference Signal) by using a part of an UpPTS (uplink part) in a switch subframe or a part of an uplink subframe (for example, a last symbol) has been known (see, for example, Japanese Patent Laying-Open No. 2010-28192 (PTL 1)).

CITATION LIST

Patent Literature

PTL 1: Japanese Patent Laying-Open No. 2010-28192

SUMMARY OF INVENTION

Technical Problem

In order to have a wireless terminal transmit an SRS, a wireless base station has to transmit a transmission command to the wireless terminal and the wireless terminal has to return a response thereto. In addition, in order to end transmission of the SRS from the wireless terminal, the wireless base station has to transmit an end command to the wireless terminal and the wireless terminal has to return a response thereto.

In the case where a wireless terminal detects an error in received downlink user data after transmission of an SRS ends and the wireless terminal requests re-sending, a wireless base station may not be able to estimate a current state of a transmission path because it has not received an SRS. In such a case, though it is also possible that the wireless base station transmits a command to transmit an SRS to the wireless terminal and the wireless terminal returns a response thereto so that the wireless terminal transmits again an SRS, it may take a long time by the time downlink user data is re-sent.

Therefore, an object of the present invention is to provide a wireless base station and a wireless communication method capable of forming a directivity for downlink user data and re-sending the downlink user data in the case where a re-sending request is generated in a wireless terminal after transmission of an SRS ends.

Solution to Problem

The present invention includes a resource determination unit for determining at least a part within any downlink subframe as a first resource for transmitting downlink user data to a wireless terminal and determining at least a part of an uplink part within a switch subframe or a part of an uplink subframe as a second resource for the wireless terminal to periodically transmit a sounding reference signal, a resource notification unit for notifying the wireless terminal of the determined second resource, a transmission path state estimation unit for estimating a state of a transmission path to the wireless terminal based on a reference signal included in uplink user data received from the wireless terminal when a re-sending request is received after transmission of the sounding reference signal is stopped, and a transmission unit for forming directivity of a plurality of antennas based on the estimated state of the transmission path and transmitting the downlink user data through the first resource.

Advantageous Effects of Invention

In the case where a re-sending request is generated in a wireless terminal after transmission of an SRS ends, directivity for downlink user data can be formed and the downlink user data can be re-sent.

DESCRIPTION OF EMBODIMENTS

An embodiment will be described hereinafter with reference to the drawings.

[First Embodiment]

(Configuration of Wireless Communication System)

Figure 1:
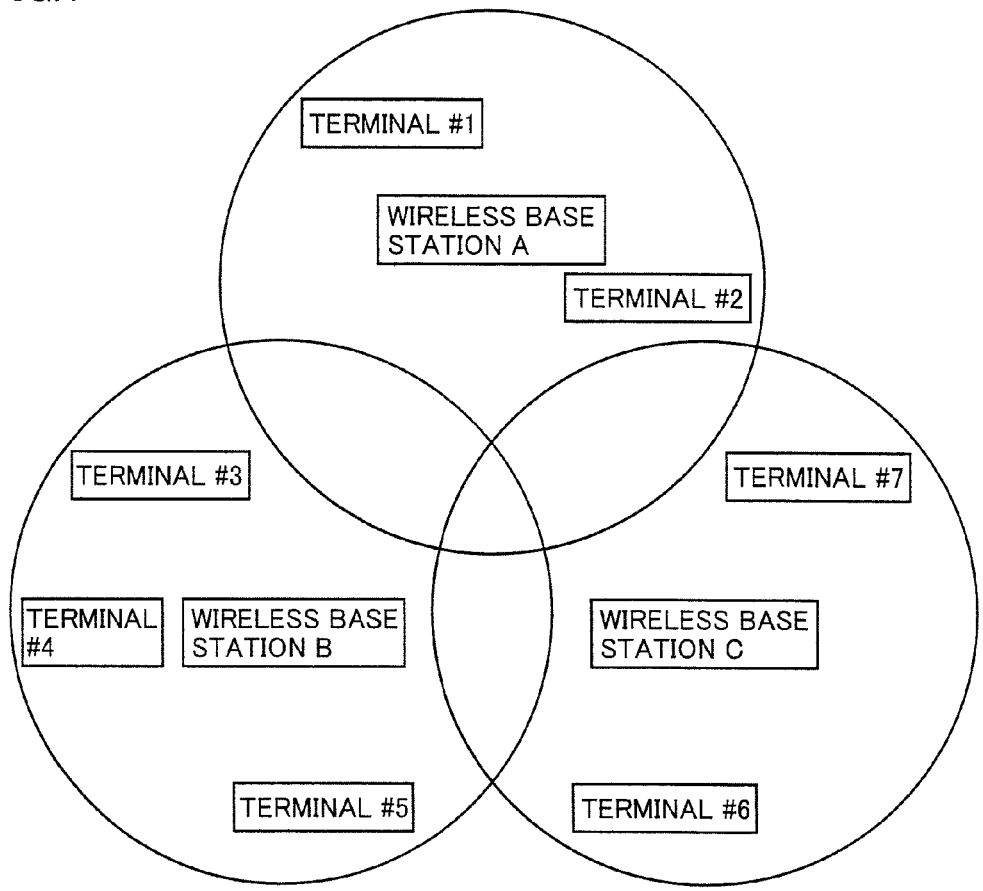
FIG. 1 is a diagram showing a configuration of a wireless communication system in an embodiment.

FIG. 1 is a diagram showing a configuration of a wireless communication system in an embodiment.

Referring to FIG. 1, this wireless communication system is a communication system adapted to an LTE scheme, in which a plurality of wireless base stations A, B, C communicate with wireless terminals within their zones shown with circles in the figure, respectively. These wireless base stations A, B, C receive uplink signals and transmit downlink signals at the same timing.

(Configuration of Wireless Base Station)

Figure 2:
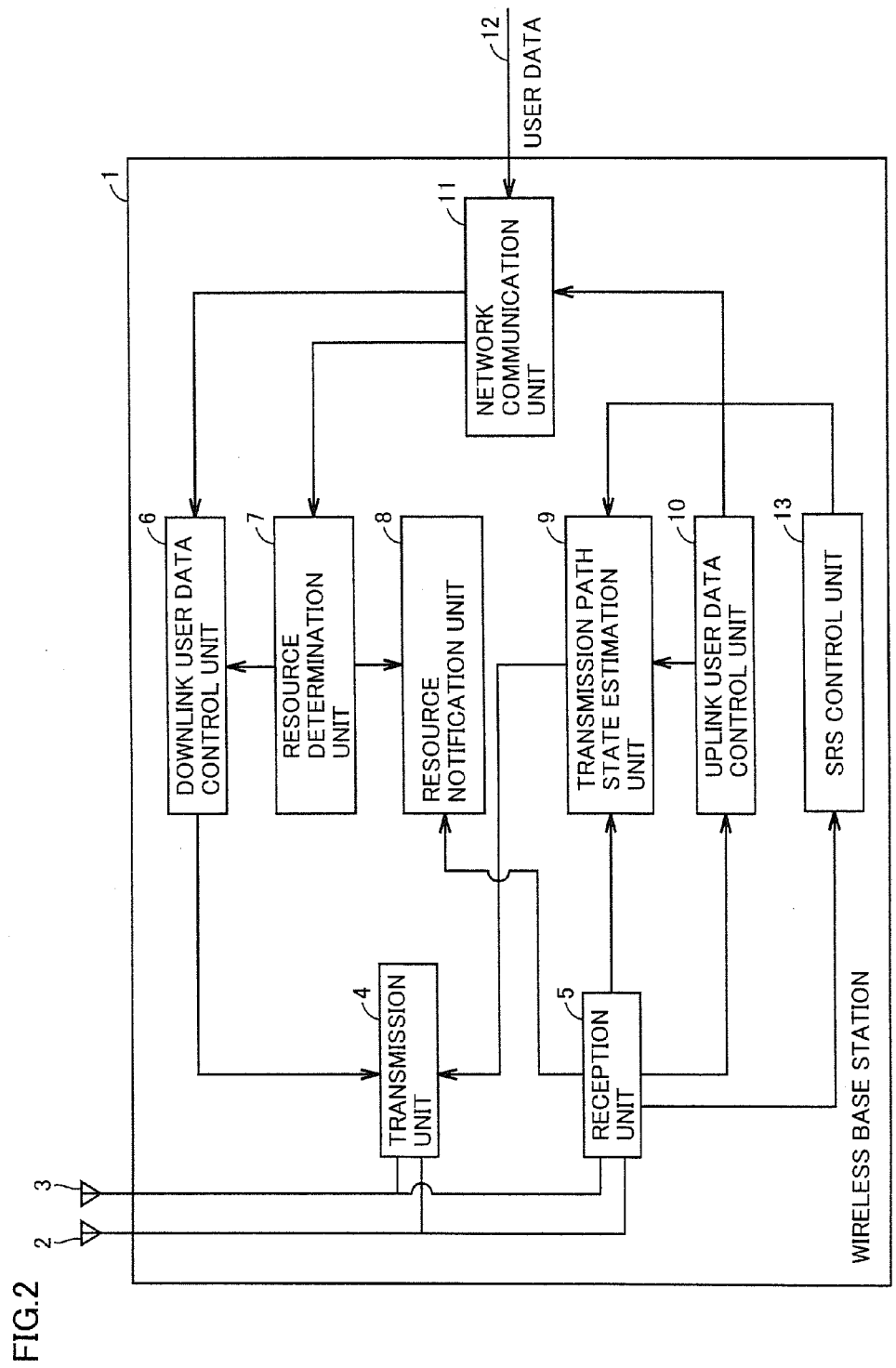
FIG. 2 is a diagram showing a configuration of a wireless base station in a first embodiment.

FIG. 2 is a diagram showing a configuration of a wireless base station in the embodiment.

Referring to FIG. 2, this wireless base station 1 includes a plurality of antennas 2, 3, a transmission unit 4, a reception unit 5, a downlink user data control unit 6, an uplink user data control unit 10, an SRS control unit 13, a resource determination unit 7, a resource notification unit 8, a transmission path state estimation unit 9, and a network communication unit 11.

Transmission unit 4 transmits downlink user data and a control signal such as an RRC (Radio Resource Control) connection re-setting message or uplink user data allocation information to a wireless terminal through the plurality of antennas 2, 3. Transmission unit 4 forms directivity of the plurality of antennas 2, 3 based on a state of a transmission path for each sub carrier estimated by transmission path state estimation unit 9 and transmits downlink user data. For example, transmission unit 4 subjects downlink user data to adaptive array transmission processing (weight control) in accordance with a state of a transmission path and forms directivity of antenna 2, 3. Here, formation of antenna directivity includes beam forming for directing beams (a portion intensely receiving/transmitting a signal) to a desired communication counterpart and null steering for directing null (a portion substantially not receiving/transmitting a signal in an unwanted signal source direction or in a direction in which interference is not desirably effected.

Reception unit 5 receives uplink user data and a control signal including an SRS, an RRC connection re-setting completion message, and the like from a wireless terminal through the plurality of antennas 2, 3.

Downlink user data control unit 6 holds downlink user data received from a not-shown control center through network communication unit 11.

Uplink user data control unit 10 transmits uplink user data received from a wireless terminal to the not-shown control center through network communication unit 11. In addition, uplink user data control unit 10 outputs a DRS (Demodulation Reference Signal) included in the received uplink user data to transmission path state estimation unit 9.

SRS control unit 13 outputs an SRS received from the wireless terminal to transmission path state estimation unit 9.

When downlink user data control unit 6 receives downlink user data from network communication unit 11, resource determination unit 7 determines at least a part within any downlink subframe as a first resource from which downlink user data to a wireless terminal is transmitted. In addition, Resource determination unit 7 determines a part of an UpPTS (uplink part) within a switch subframe as a second resource for a wireless terminal to periodically transmit an SRS. Moreover, when a re-sending request signal in a HARQ (Hybrid Automatic Repeat Request) is received from a wireless terminal, resource determination unit 7 determines at least a part within any uplink subframe UL as a third resource for the wireless terminal to transmit uplink user data including a DRS.

Resource notification unit 8 transmits uplink user data allocation information representing the third resource determined by resource determination unit 7 to a wireless terminal. Resource notification unit 8 transmits a RRC connection re-setting message representing the second resource determined by resource determination unit 7 to the wireless terminal. Resource notification unit 8 receives an RRC connection re-setting completion message from the wireless terminal.

Transmission path state estimation unit 9 estimates a state of a transmission path based on an SRS or a DRS. Transmission path state estimation unit 9 estimates a state of a transmission path to a wireless terminal based on a received, most recent SRS in an SRS transmission section. When a re-sending request signal is received after transmission of an SRS is stopped, transmission path state estimation unit 9 estimates a state of a transmission path to a wireless terminal based on a DRS included in uplink user data received from the wireless terminal.

Network communication unit 11 receives downlink user data from a control center through a network 12. Network communication unit 11 transmits uplink user data to the control center through network 12.

(Configuration of Wireless Terminal)

Figure 3:
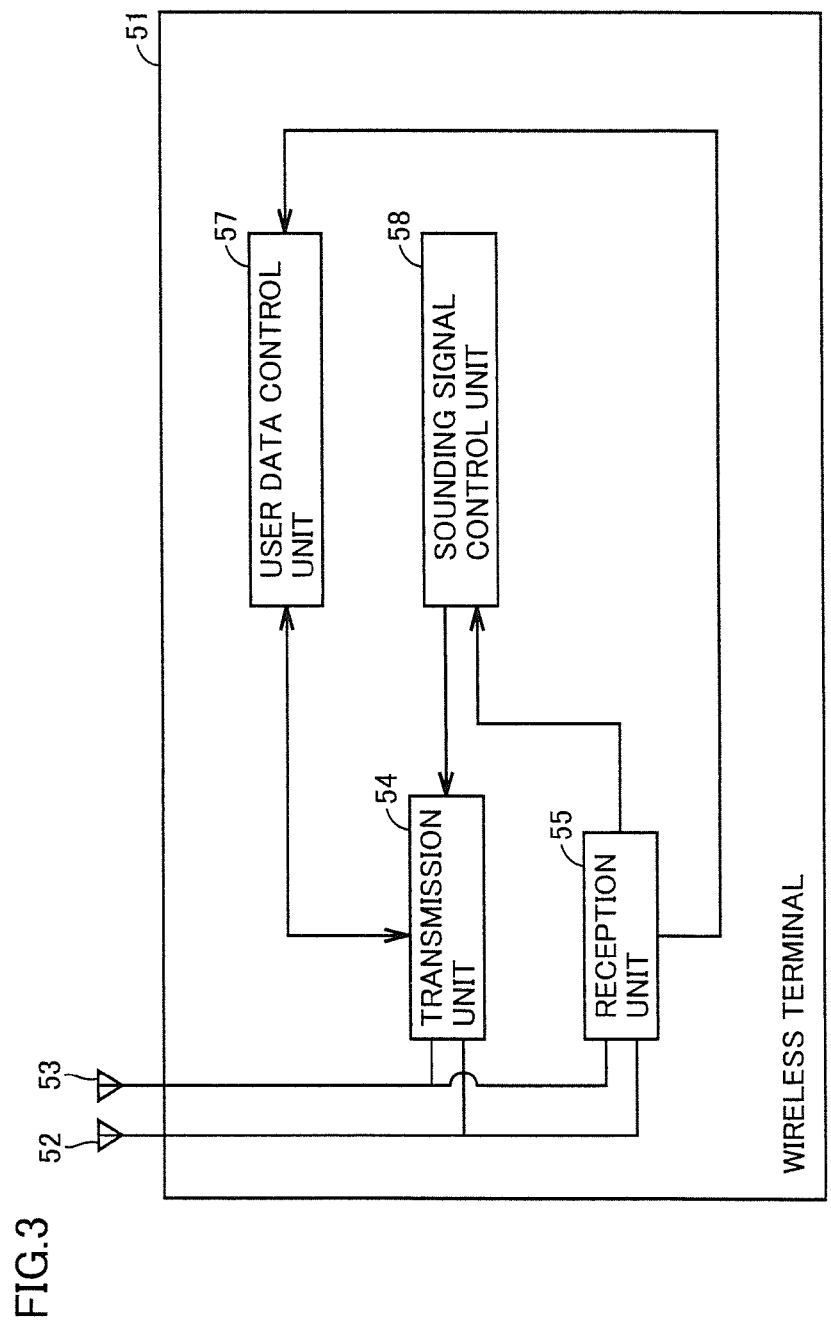
FIG. 3 is a diagram showing a configuration of a wireless terminal in the embodiment.

FIG. 3 is a diagram showing a configuration of a wireless terminal in the embodiment.

Referring to FIG. 3, this wireless terminal 52 includes a plurality of antennas 52, 53, a transmission unit 54, a reception unit 55, a user data control unit 57, and a sounding signal control unit 58.

Reception unit 55 receives downlink user data and a control signal such as an RRC connection re-setting message through the plurality of antennas 52, 53.

Transmission unit 54 transmits uplink user data and a control signal such as an SRS and an RRC connection re-setting completion message to wireless base station 1 through the plurality of antennas 52, 53.

User data control unit 57 holds and controls downlink user data received from wireless base station 1 and uplink user data to be transmitted to wireless base station 1.

When sounding signal control unit 58 receives an RRC connection re-setting message, sounding signal control unit 58 allocates a wireless resource from which an SRS is to be transmitted, based on the RRC connection re-setting message. Thereafter, sounding signal control unit 58 transmits an RRC connection re-setting completion message. Sounding signal control unit 58 transmits an SRS by using the allocated wireless resource.

(Configuration of Frame)

Figure 4:
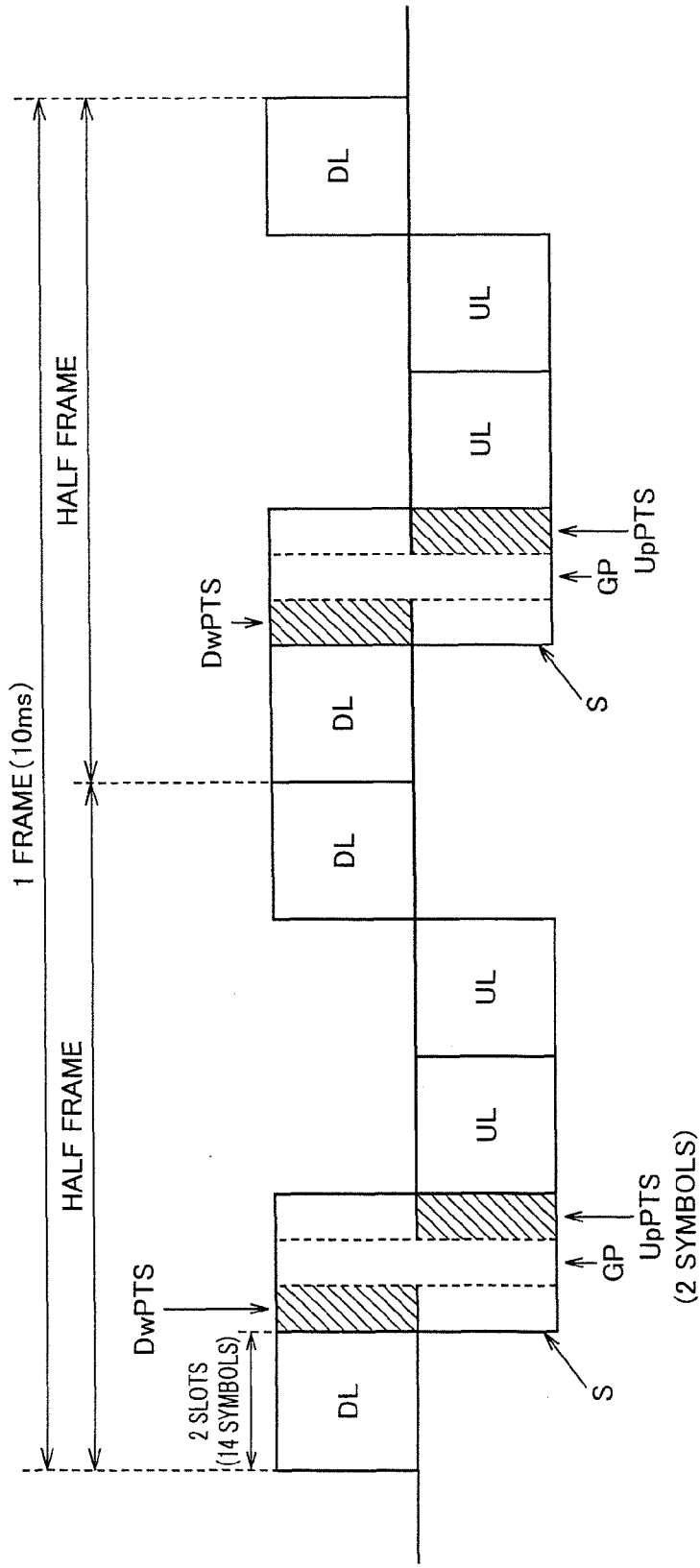
FIG. 4 is a diagram showing a configuration of a frame transmitted in the wireless communication system in the embodiment.

FIG. 4 is a diagram showing a configuration of a frame transmitted in the wireless communication system in the embodiment.

Referring to FIG. 4, a configuration of this frame is a configuration at the time when an (Uplink-downlink configuration) in the LTE is set to "1".

As shown in FIG. 4, one frame is transmitted in a time period of 10 ms. One frame is divided into half frames. Each half frame is formed, in time sequence, of a downlink subframe DL, a switch subframe S, two consecutive uplink subframes UL, and a downlink subframe DL.

Here, switch subframe S is formed of a DwPTS (Downlink Pilot Timeslot), a GP (Guard Period), and an UpPTS (Uplink Pilot Timeslot; also referred to as an uplink part). The UpPTS is formed of 2 symbols.

(Process Timing in First Embodiment)

Figure 5:
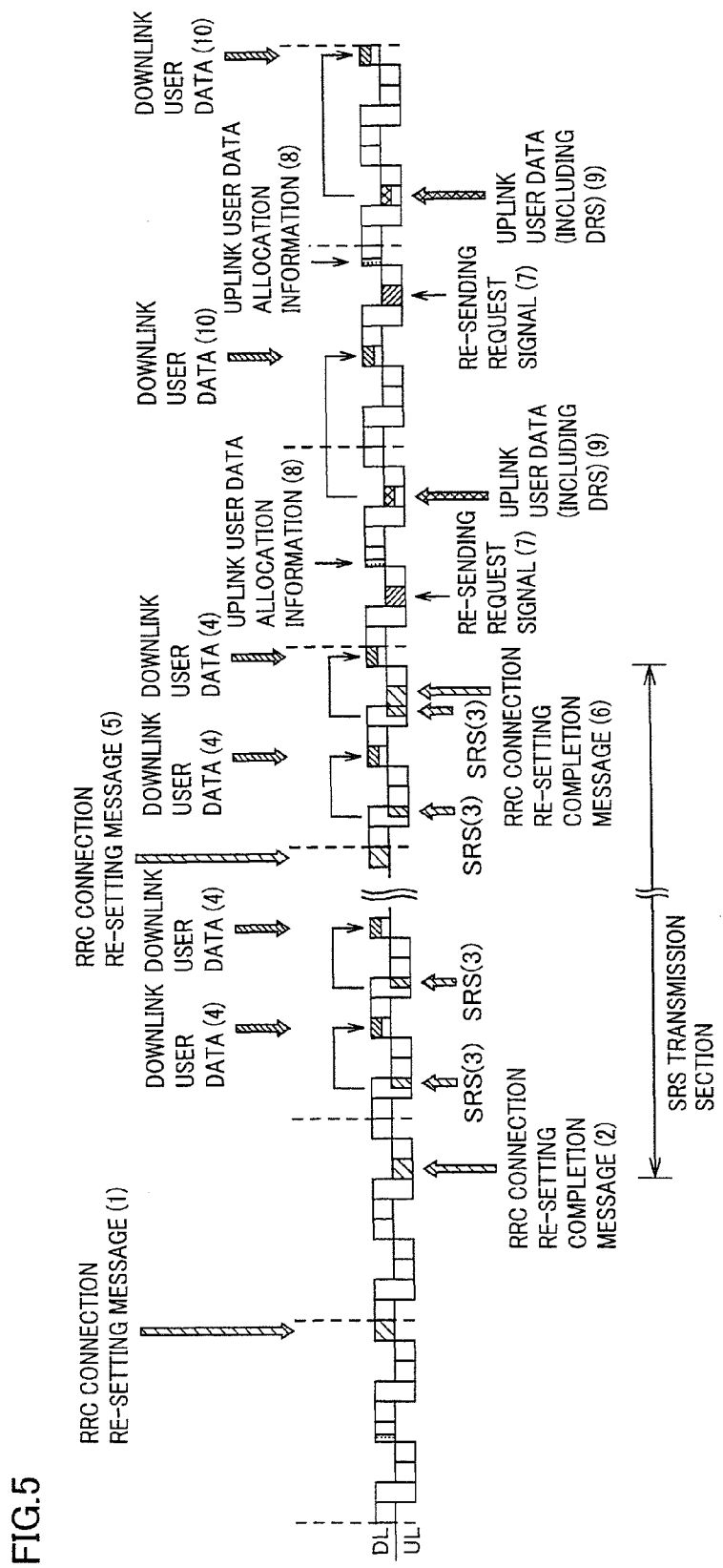
FIG. 5 is a diagram for illustrating processing timing in the first embodiment.

FIG. 5 is a diagram for illustrating processing timing in a first embodiment.

Referring to FIG. 5, wireless base station 1 determines a second resource from which an SRS is periodically transmitted in wireless terminal 51 which is a destination of downlink user data. Wireless base station 1 transmits an RRC connection re-setting (indicating start of transmission) message representing the determined second resource (shown with (1)). Wireless terminal 51 transmits an RRC connection re-setting (indication start of transmission) completion message (shown with (2)). Thus, an SRS transmission section is started.

Wireless terminal 52 transmits an SRS through the second resource of which notification has been given (shown with (3)). Wireless base station 1 estimates a state of a transmission path to wireless terminal 51 based on the received SRS.

Wireless base station 1 determines at least a part within a downlink subframe as a first resource for transmitting downlink user data to the wireless terminal. Wireless base station 1 forms directivity of the plurality of antennas based on the estimated state of the transmission path and transmits through the first resource, the downlink user data and downlink user allocation information indicating that this first resource includes the downlink user data (shown with (4)). Transmission of an SRS (3) by wireless terminal 51 and transmission of downlink user data (4) based on the SRS by wireless base station 1 are repeated.

Wireless base station 1 transmits an RRC connection re-setting (indicating end of transmission) message (shown with (5)). Wireless terminal 51 transmits an RRC connection re-setting (indicating end of transmission) completion message (shown with (6)). Thus, the SRS transmission section ends.

When an error is detected in received downlink user data after the SRS transmission section ends, wireless terminal 51 transmits a re-sending request signal (shown with (7)). Wireless base station 1 determines a third resource from which wireless terminal 51 transmits uplink user data including a DRS and transmits uplink user data allocation information representing the determined third resource (shown with (8)). Wireless terminal 51 transmits uplink user data including the DRS by using the third resource of which notification has been given (shown with (9)). Wireless base station 1 estimates a state of a transmission path to wireless terminal 51 based on the received DRS.

Wireless base station 1 determines at least a part within a downlink subframe as the first resource for transmitting downlink user data to the wireless terminal. Wireless base station 1 forms directivity of the plurality of antennas based on the estimated state of the transmission path and transmits through the first resource, downlink user data of which re-sending has been requested and downlink user allocation information indicating that this first resource includes the downlink user data (shown with (10)). The processing from (7) to (10) is repeated until an error is no longer detected in the downlink user data received by wireless terminal 51.

(Operation Procedure)

Figure 6:
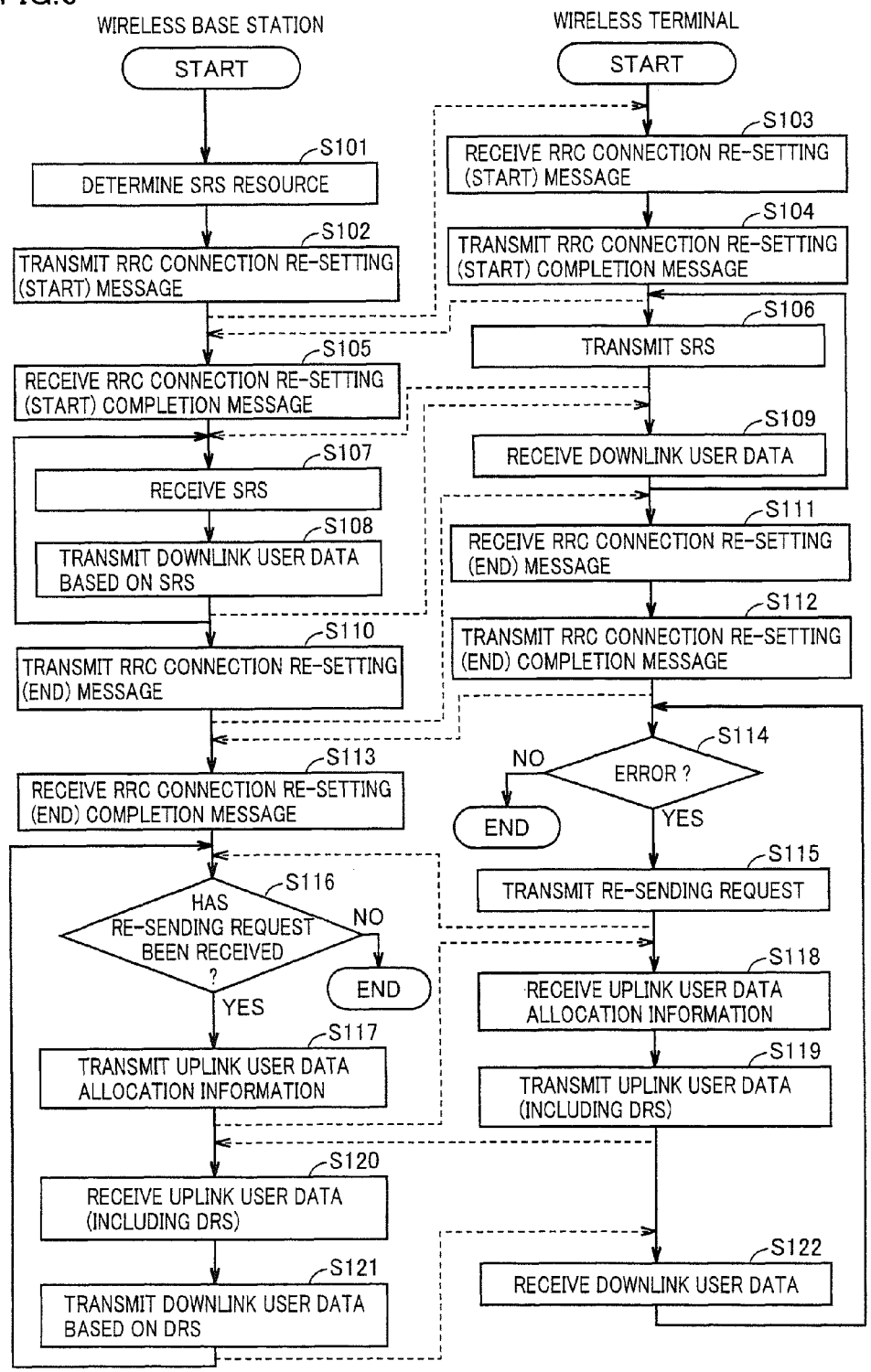
FIG. 6 is a flowchart showing an operation procedure in the wireless communication system in the first embodiment.

FIG. 6 is a flowchart showing an operation procedure in the wireless communication system in the first embodiment.

Referring to FIG. 6, initially, resource determination unit 7 of wireless base station 1 determines any resource within an UpPTS in switch subframe S as a second resource for wireless terminal 51 to periodically transmit an SRS (step S101).

Then, resource notification unit 8 or wireless base station 1 transmits an RRC connection re-setting (indicating start of transmission) message representing the determined second resource (step S102).

Then, sounding signal control unit 58 of wireless terminal 51 receives the RRC connection re-setting (indicating start of transmission) message (step S103).

Then, sounding signal control unit 58 of wireless terminal 51 transmits an RRC connection re-setting (indicating start of transmission) completion message (step S104).

Then, resource notification unit 8 of wireless base station 1 receives the RRC connection re-setting (indicating start of transmission) completion message (step S105).

Then, sounding signal control unit 58 of wireless terminal 51 transmits an SRS by using the second resource of which notification has been given (step S106).

Then, SRS control unit 13 of wireless base station 1 receives the SRS (step S107).

Then, transmission path state estimation unit 9 of wireless base station 1 estimates a state of a transmission path to wireless terminal 51 based on the SRS received in step S107. Resource determination unit 7 of wireless base station 1 determines at least a part within any downlink subframe DL as a first resource for transmitting downlink user data to wireless terminal 51. Transmission unit 4 of wireless base station 1 forms directivity of the plurality of antennas 2, 3 based on the estimated state of the transmission path and transmits through the first resource, the downlink user data and downlink user allocation information indicating that this first resource includes the downlink user data (step S108).

Then, reception unit 55 of wireless terminal 51 receives the downlink user data through the plurality of antennas 52, 53 (step S109).

Thereafter, processing in steps S106 to S109 is repeated.

Then, resource notification unit 8 of wireless base station 1 transmits an RRC connection re-setting (indicating end of transmission) message (step S110).

Then, sounding signal control unit 58 of wireless terminal 51 receives the RRC connection re-setting (indicating end of transmission) message (step S111).

Then, sounding signal control unit 58 of wireless terminal 51 transmits an RRC connection re-setting (indicating end of transmission) completion message (step S112).

Then, resource notification unit 8 of wireless base station 1 receives the RRC connection re-setting (indicating end of transmission) completion message (step S113).

When an error is detected in the received downlink user data (YES in step S114), user data control unit 57 of wireless terminal 51 transmits a re-sending request signal (NACK: Negative ACKnowledgements) based on HARQ (step S115).

Then, when the re-sending request signal is received (YES in step S116), resource determination unit 7 of wireless base station 1 determines at least a part within any uplink subframe UL as a third resource for wireless terminal 51 to transmit uplink user data including a DRS. Resource notification unit 8 of wireless base station 1 transmits uplink user data allocation information representing the determined third resource (step S117).

Then, user data control unit 57 of wireless terminal 51 receives the uplink user data allocation information representing the third resource (step S118).

Then, user data control unit 57 of wireless terminal 51 transmits the uplink user data including the DRS by using the third resource of which notification has been given in step S118 (step S119).

Then, uplink user data control unit 10 of wireless base station 1 receives the uplink user data including the DRS (step S120).

Then, transmission path state estimation unit 9 of wireless base station 1 estimates a state of a transmission path to wireless terminal 51 based on the DRS received in step S120. Resource determination unit 7 of wireless base station 1 determines at least a part within any downlink subframe DL as a first resource for transmitting downlink user data to wireless terminal 51. Transmission unit 4 of wireless base station 1 forms directivity of the plurality of antennas 2, 3 based on the estimated state of the transmission path and transmits through the first resource, the downlink user data of which re-sending has been requested and downlink user allocation information indicating that this first resource includes the downlink user data (step S121).

Then, reception unit 55 of wireless terminal 51 receives the downlink user data through the plurality of antennas, 52, 53 and the process returns to step S114 (step S122).

As described above, according to the wireless communication system in the first embodiment, when a re-sending request is generated in a wireless terminal after transmission of an SRS ends, a wireless base station can quickly estimate a state of a transmission path by using a DRS included in uplink user data, so that downlink user data having directivity can quickly be re-sent.

[Variation of First Embodiment]

(Processing Timing in Variation of First Embodiment)

Figure 7:
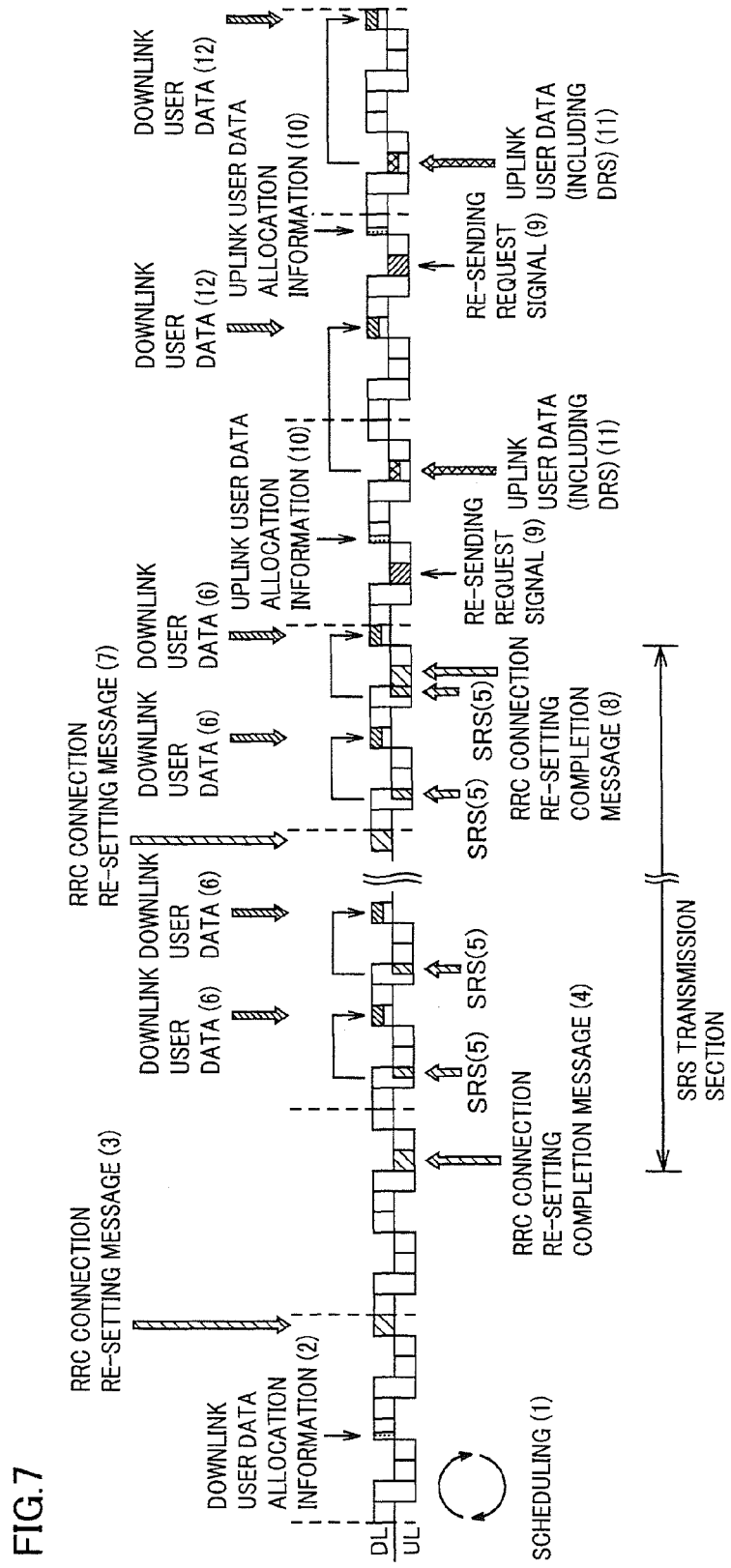
FIG. 7 is a diagram for illustrating processing timing in a variation of the first embodiment.

FIG. 7 is a diagram for illustrating processing timing in a variation of the first embodiment.

Processing shown in FIG. 7 is different from that in FIG. 5 as follows.

In FIG. 5, wireless base station 1 determines a first resource each timing before transmission of downlink user data, whereas in FIG. 7, wireless base station 1 periodically transmits downlink user data by using the same first resource. Wireless base station 1 determines this first resource only once in the beginning and notifies wireless terminal 51 of that fact.

Namely, as shown in FIG. 7, wireless base station 1 determines a first resource from which downlink user data is periodically transmitted in a prescribed downlink subframe DL and a subsequent subframe and a second resource from which an SRS is periodically transmitted in wireless terminal 51 which is a destination of the downlink user data (shown with (1)). Then, wireless base station 1 transmits downlink user data allocation information representing the determined first resource (shown with (2)).

Other procedures in FIG. 7 are the same as these in FIG. 5.

[Second Embodiment]

Figure 8:
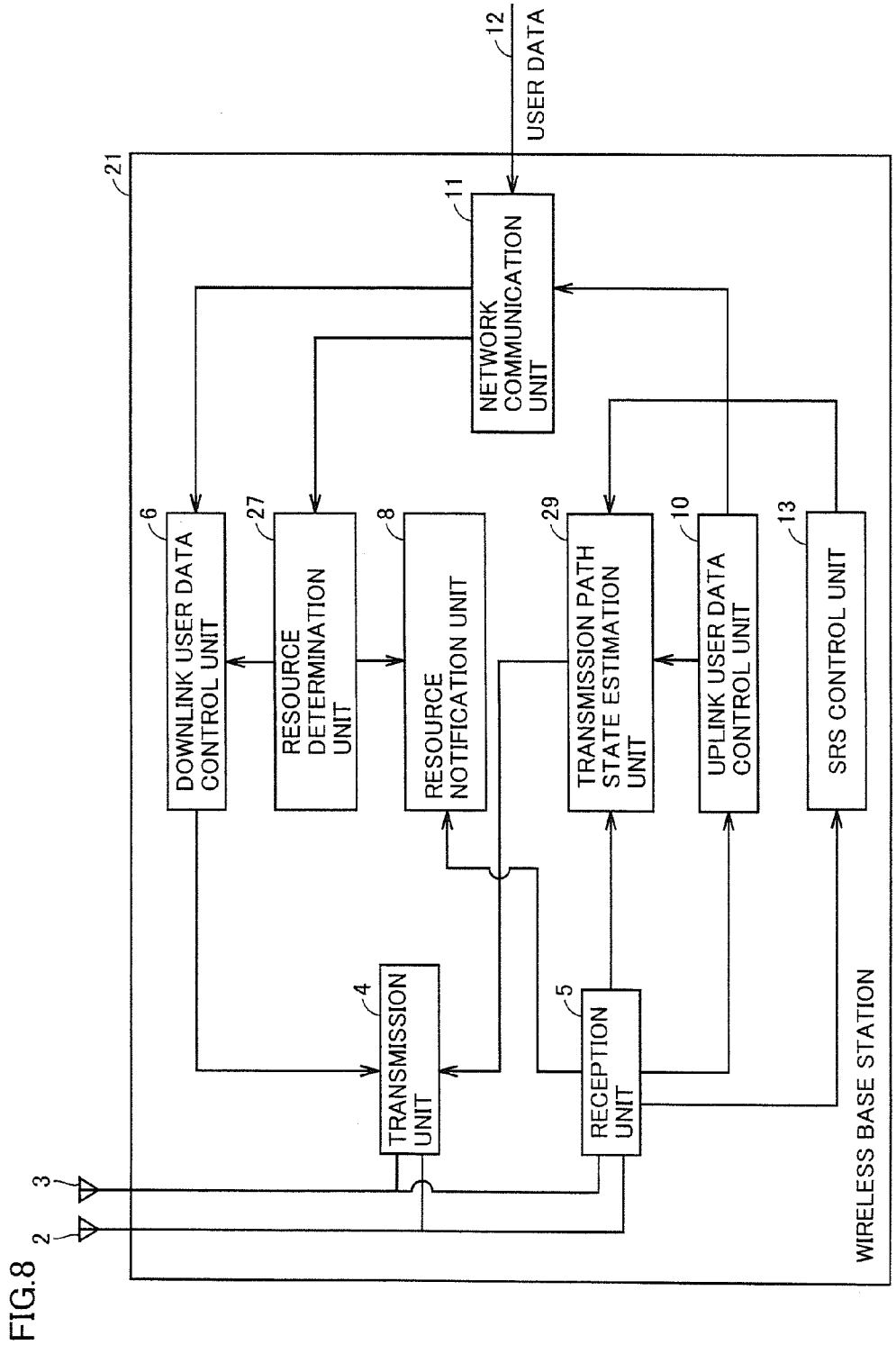
FIG. 8 is a diagram showing a configuration of a wireless base station in a second embodiment.

FIG. 8 is a diagram showing a configuration of a wireless base station in a second embodiment.

Difference in configuration of a wireless base station 21 in FIG. 8 from wireless base station 1 in FIG. 2 resides in a resource determination unit 27 and a transmission path state estimation unit 29.

When downlink user data control unit 6 receives downlink user data from network communication unit 11, resource determination unit 27 determines at least a part within any downlink subframe as a first resource from which downlink user data to a wireless terminal is transmitted. In addition, resource determination unit 27 determines a part of an UpPTS (uplink part) within a switch subframe as a second resource for the wireless terminal to periodically transmit an SRS. When a cumulative total of received re-sending request signals is equal to or greater than a threshold value TH at the time when a re-sending request signal is received from the wireless terminal, resource determination unit 27 determines at least a part within any uplink subframe UL as a third resource for the wireless terminal to transmit uplink user data including a DRS.

Transmission path state estimation unit 29 estimates a state of a transmission path based on an SRS or a DRS. Transmission path state estimation unit 29 estimates a state of a transmission path to the wireless terminal based on a received, most recent SRS in an SRS transmission section. When a re-sending request signal is received after transmission of an SRS is stopped and when the cumulative total of received re-sending request signals is smaller than threshold value TH, transmission path state estimation unit 29 estimates a state of the transmission path to the wireless terminal based on the last received SRS, and when the cumulative total of received re-sending request signals is equal to or greater than threshold value TH, it estimates a state of the transmission path to the wireless terminal based on a DRS included in uplink user data received from the wireless terminal.

(Processing Timing in Second Embodiment)

Figure 9:
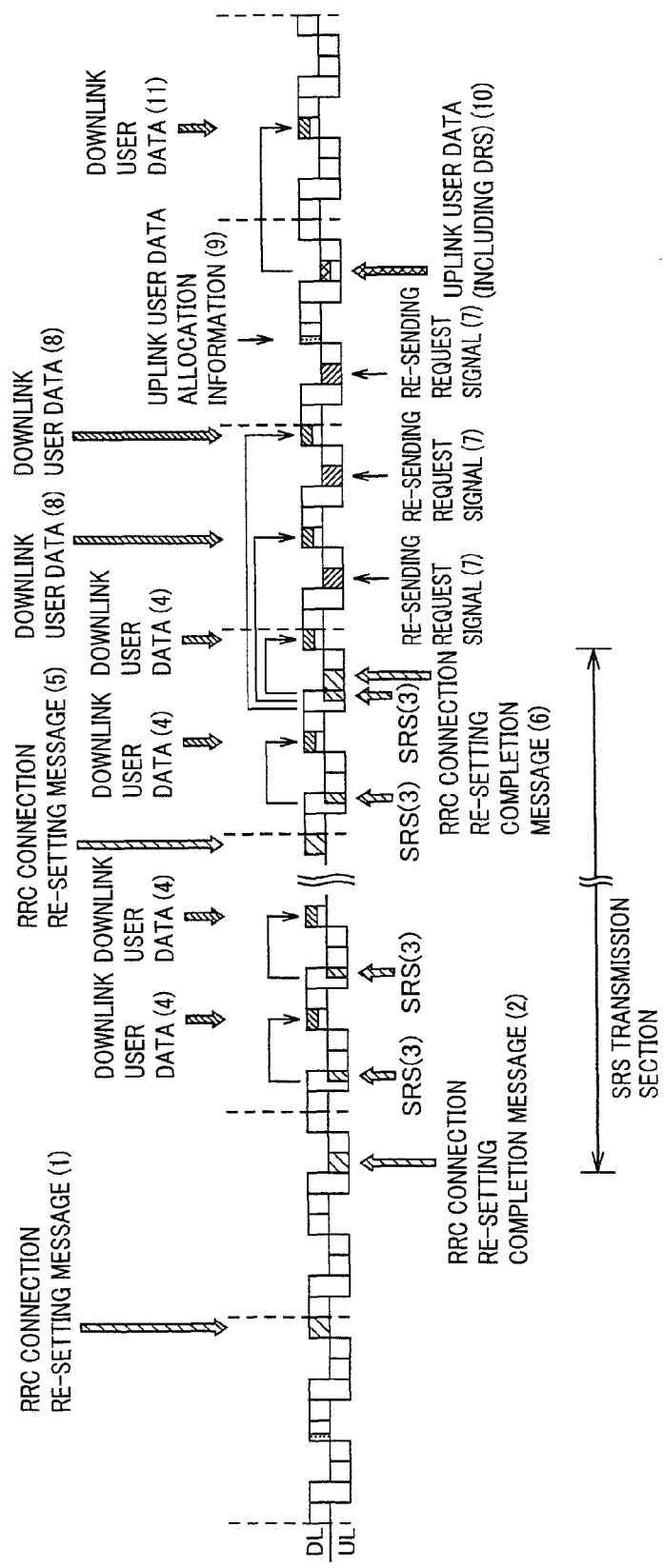
FIG. 9 is a diagram for illustrating processing timing in the second embodiment.

FIG. 9 is a diagram for illustrating processing timing in the second embodiment Referring to FIG. 9, wireless base station 21 determines a second resource from which an SRS is periodically transmitted in wireless terminal 51 which is a destination of downlink user data. Wireless base station 21 transmits an RRC connection re-setting (indicating start of transmission) message representing the determined second resource (shown with (1)). Wireless terminal 51 transmits an RRC connection re-setting (indicating start of transmission) completion message (shown with (2)). Thus, an SRS transmission section is started.

Wireless terminal 51 transmits an SRS through the second resource of which notification has been given (shown with (3)). Wireless base station 21 estimates a state of a transmission path to wireless terminal 51 based on the received SRS.

Wireless base station 21 determines at least a part within a downlink subframe as a first resource tor transmitting downlink user data to the wireless terminal. Wireless base station 21 forms directivity of the plurality of antennas based on the estimated state of the transmission path and transmits the downlink user data and downlink user allocation information indicating that this first resource includes the downlink user data (shown with (4)). Transmission of an SRS (3) by wireless terminal 51 and transmission of downlink user data (4) based on the SRS by wireless base station 21 are repeated.

Wireless base station 21 transmits an RRC connection re-setting (indicating end of transmission) message (shown with (5)). Wireless terminal 51 transmits an RRC connection re-setting (indicating end of transmission) completion message (shown with (6)). Thus, the SRS transmission section ends.

When an error is detected in received downlink user data after the SRS transmission section ends, wireless terminal 51 transmits a re-sending request signal (shown with (7)).

When the number of times of reception of the re-sending request signals is smaller than threshold value TH (here, TH=3 is assumed), wireless base station 21 estimates a state of the transmission path to wireless terminal 51 based on the last received SRS. Wireless base station 21 determines at least a part within a downlink subframe as a first resource for transmitting downlink user data to the wireless terminal. Wireless base station 21 forms directivity of the plurality of antennas based on the estimated state of the transmission path and transmits through the first resource, downlink user data and downlink user allocation information indicating that this first resource includes the downlink user data (shown with (8)).

When the number of times of reception of re-sending request signals is equal to or greater than threshold value TH (here, TH=3 is assumed), wireless base station 21 determines a third resource from which wireless terminal 51 transmits uplink user data including a DRS and transmits uplink user data allocation information representing the determined third resource (shown with (9)).

Wireless terminal 51 transmits uplink user data including the DRS by using the third resource of which notification has been given (shown with (10)). Wireless base station 21 estimates a state of a transmission path to wireless terminal 51 based on the received DRS.

Wireless base station 21 determines at least a part within a downlink subframe as a first resource for transmitting downlink user data to wireless terminal 51. Wireless base station 21 forms directivity of the plurality of antennas based on the estimated state of the transmission path and transmits through the first resource, downlink user data of which re-sending has been requested and downlink user allocation information indicating that this first resource includes the downlink user data (shown with (11)).

The processing of (7) and from (9) to (11) is repeated until an error is no longer detected in the downlink user data received by wireless terminal 51.

(Operation Procedure)

Figure 10:
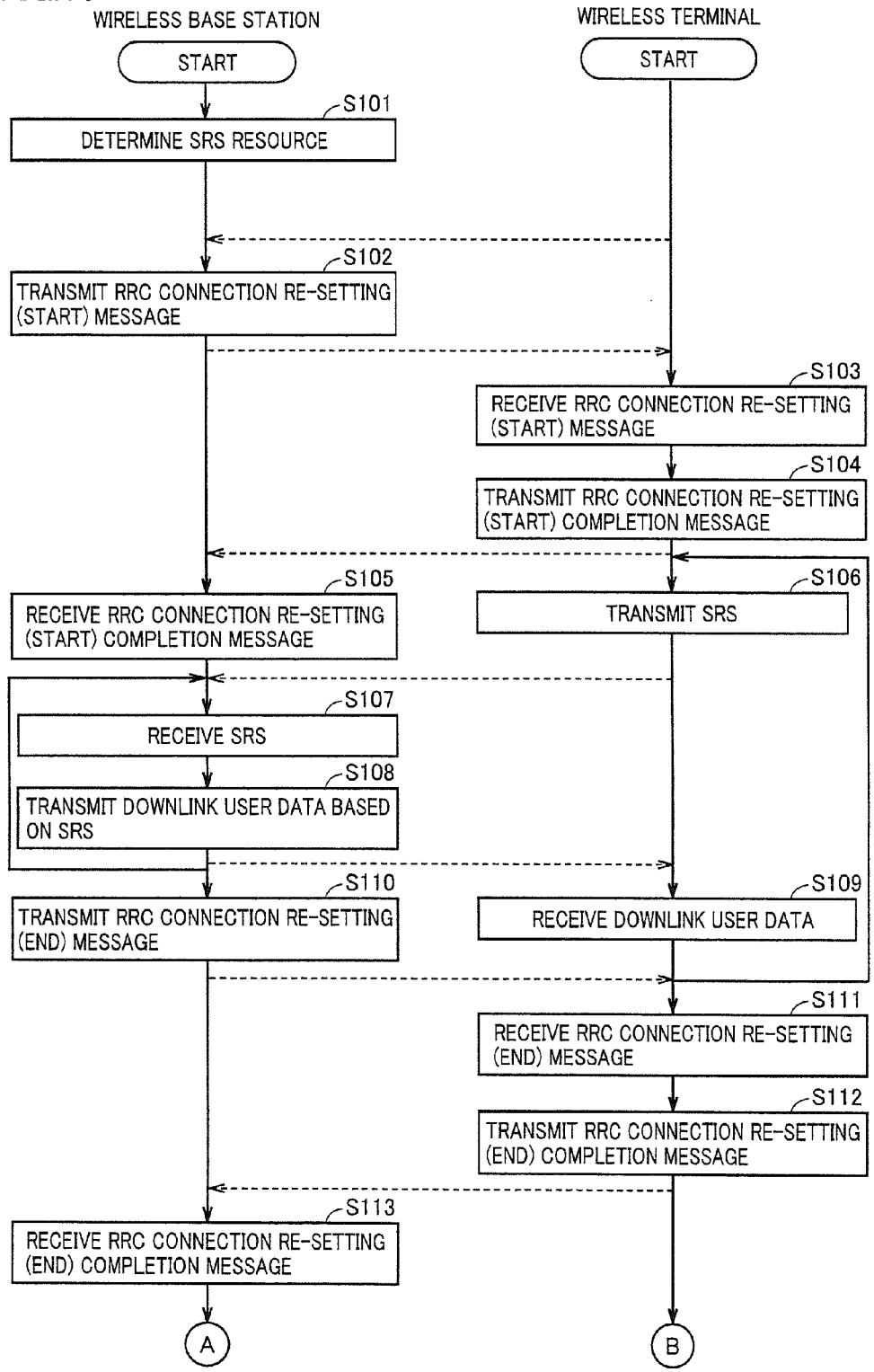
FIG. 10 is a flowchart showing an operation procedure in the wireless communication system in the second embodiment.
Figure 11:
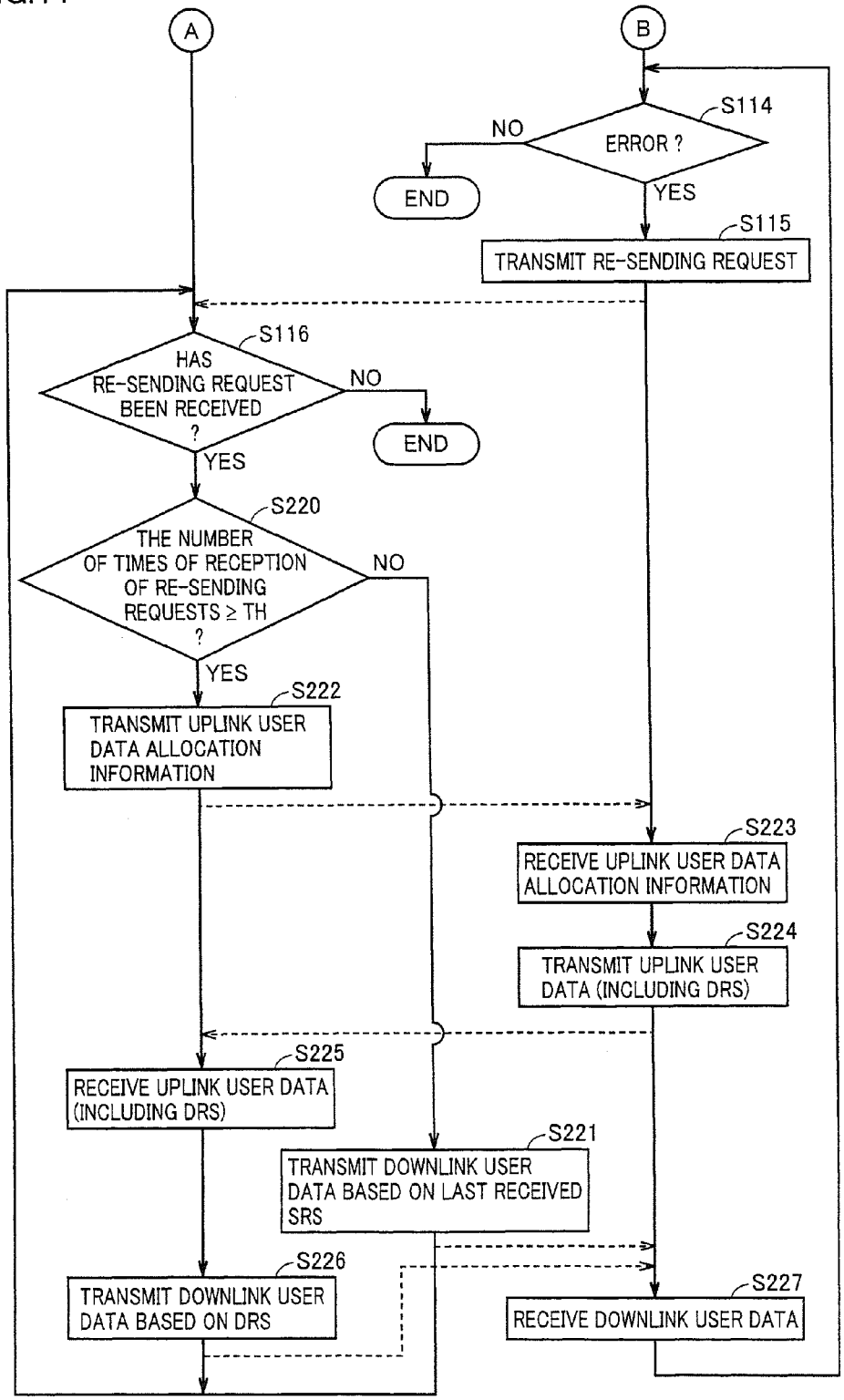
FIG. 11 is a flowchart showing the operation procedure in the wireless communication system in the second embodiment.

FIGS. 10 and 11 are flowcharts showing an operation procedure in the wireless communication system in the second embodiment.

Referring to FIGS. 10 and 11, initially, resource determination unit 27 of wireless base station 21 determines any resource within an UpPTS in switch subframe S as a second resource for wireless terminal 51 to periodically transmit an SRS (step S1010).

Then, resource notification unit 8 of wireless base station 21 transmits an RRC connection re-setting (indicating start of transmission) message representing the determined second resource (step S102).

Then, sounding signal control unit 58 of wireless terminal 51 receives the RRC connection re-setting (indicating start of transmission) message (step S103).

Then, sounding signal control unit 58 of wireless terminal 51 transmits an RRC connection re-setting (indicating start of transmission)completion message (step S104).

Then, resource notification unit 8 of wireless base station 21 receives the RRC connection re-setting (indicating start of transmission) completion message (step S105).

Then, sounding signal control unit 58 of wireless terminal 51 transmits an SRS by using the second resource of which notification has been given (step S106).

Then, SRS control unit 13 of wireless base station 21 receives the SRS (step S107).

Then, transmission path state estimation unit 29 of wireless base station 21 estimates a state of a transmission path to wireless terminal 51 based on the SRS received in step S107. Resource determination unit 27 of wireless base station 21 determines at least a part within any downlink subframe DL as a first resource for transmitting downlink user data to wireless terminal 51. Transmission unit 4 of wireless base station 1 forms directivity of the plurality of antennas 2, 3 based on the estimated state of the transmission path and transmits through the first resource, the downlink user data and downlink user allocation information indicating that this first resource includes the downlink user data (step S108).

Then, reception unit 55 of wireless terminal 51 receives the downlink user data through the plurality of antennas 52, 53 (step S109).

Thereafter, processing in steps S106 to S109 is repeated.

Then, resource notification unit 8 of wireless base station 21 transmits an RRC connection re-setting (indicating end of transmission) message (step S110).

Then, sounding signal control unit 58 of wireless terminal 51 receives the RRC connection re-setting (indicating end of transmission)message (step S111).

Then, sounding signal control unit 58 of wireless terminal 51 transmits an RRC connection re-setting (indicating end of transmission) completion message (step S112).

Then, resource notification unit 8 of wireless base station 21 receives the RRC connection re-setting (indicating end of transmission) completion message (step S113).

When an error is detected in the received downlink user data (YES in step S114), user data control unit 57 of wireless terminal 51 transmits a re-sending request signal (NACK: Negative ACKnowledgements) based on HARQ (step S115).

Then, when a re-sending request signal is received (YES in step S116) and when the cumulative number of times of reception of the re-sending request signals is smaller than threshold value TH (NO in step S220), transmission path state estimation unit 29 of wireless base station 21 estimates a state of the transmission path to wireless terminal 51 based on the last received SRS. Resource determination unit 27 of wireless base station 21 determines at least a part within any downlink subframe DL as a first resource for transmitting downlink user data to wireless terminal 51. Transmission unit 4 of wireless base station 21 forms directivity of the plurality antennas 2, 3 based on the estimated state of the transmission path and transmits through the first resource, the downlink user data of which re-sending has been requested and downlink user allocation information indicting that this first resource includes the downlink user data (step S221).

When a re-sending request signal is received (YES in step S116) and when the cumulative number of times of reception of the re-sending request signals is equal to or greater than threshold value TH (YES in step S220), resource determination unit 27 of wireless base station 21 determines at least a part within any uplink subframe UL as a third resource for wireless terminal 51 to transmit uplink user data including a DRS. Resource notification unit 8 of wireless base station 21 transmits uplink user data allocation information representing the determined third resource (step S222).

Then, user data control unit 57 of wireless terminal 51 receives the uplink user data allocation information representing the third resource (step S223).

Then user data control unit 57 of wireless terminal 51 transmits the uplink user data including the DRS by using the third resource of which notification has been given in step S223 (step S224).

Then, uplink user data control unit 10 of wireless base station 21 receives the uplink user data including the DRS (step S225).

Then, transmission path state estimation unit 29 of wireless base station 21 estimates a state of a transmission path to wireless terminal 51 based on the DRS received in step S225. Resource determination unit 27 of wireless base station 21 determines at least a part within any downlink subframe DL as a first resource for transmitting downlink user data to wireless terminal 51. Transmission unit 4 of wireless base station 21 forms directivity of the plurality of antennas 2, 3 based on the estimated state of the transmission path and transmits through the first resource, the downlink user data of which re-sending has been requested and downlink user allocation information indicating that this first resource includes the downlink user data (step S226).

Then, reception unit 55 of wireless terminal 51 receives the downlink user data through the plurality of antennas 52, 53 and the process returns to step S114 (step S227).

As described above, according to the wireless communication system in the second embodiment, when a re-sending request is generated in a wireless terminal after transmission of an SRS ends, at first, a wireless base station uses the last received SRS because it expresses to some extent a current status of a transmission path. Thereafter, since the last received SRS will no longer express a current status of the transmission path, the wireless base station uses a DRS included in uplink user data, which is different from the SRS. Thus, a state of a transmission path can quickly and accurately be estimated, and downlink user data having directivity can quickly and accurately be re-sent.

[Variation of Second Embodiment]

(Processing Timing in Variation of Second Embodiment)

Figure 12:
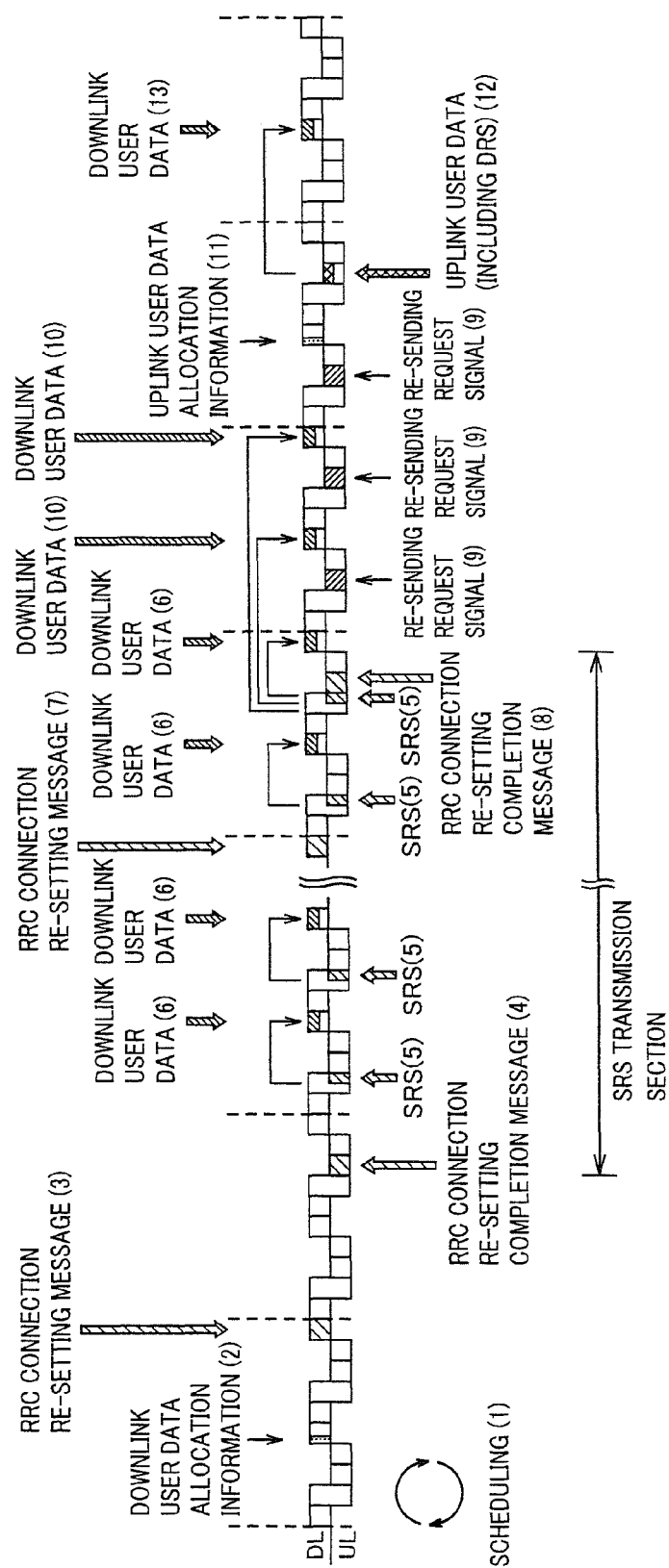
FIG. 12 is a diagram for illustrating processing timing in a variation of the second embodiment.

FIG. 12 is a diagram for illustrating processing timing in a variation of the second embodiment.

Processing shown in FIG. 12 is different from that in FIG. 9 as follows.

In FIG. 9, wireless base station 21 determines a first resource each timing before transmission of downlink user data, whereas in FIG. 12, wireless base station 21 periodically transmits downlink user data by using the same first resource. Wireless base station 21 determines this first resource only once in the beginning and notifies wireless terminal 51 of that fact.

Namely, as shown in FIG. 12, wireless base station 21 determines a first resource from which downlink user data is periodically transmitted in a prescribed downlink subframe DL and a subsequent subframe and a second resource from which an SRS is periodically transmitted in wireless terminal 51 which is a destination of the downlink user data (shown with (1)). The, wireless base station 21 transmits downlink user data allocation information representing the determined first resource (shown with (2)).

Other procedures in FIG. 12 are the same as those in FIG. 9.

[Third Embodiment]

Figure 13:
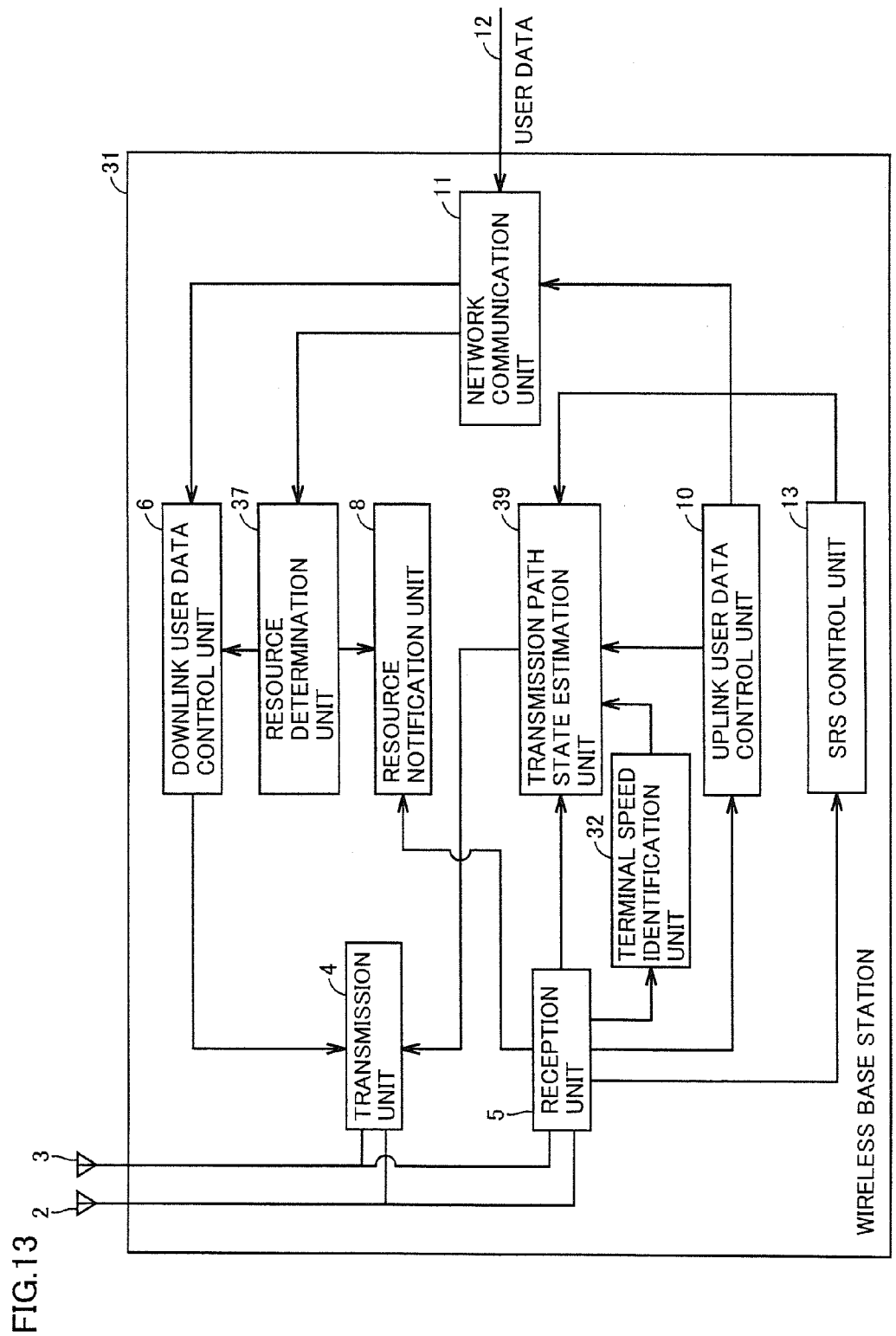
FIG. 13 is a diagram showing a configuration of a wireless base station in a third embodiment.

FIG. 13 is a diagram showing a configuration of a wireless base station in a third embodiment.

Difference in configuration of a wireless base station 31 in FIG. 13 from wireless base station 1 in FIG. 2 resides in a resource determination unit 37, a transmission path state estimation unit 39, and a terminal speed identification unit 32.

Terminal speed identification unit 32 calculates a reception response vector of wireless terminal 51 which is communicating. Terminal speed identification unit 32 estimates a Doppler frequency FD of wireless terminal 51 by calculating a correlation value of two or more reception response vectors different in time, of wireless terminal 51. In addition, terminal speed identification unit 32 calculates a moving speed of wireless terminal 51 as a value in prounit to the Doppler frequency. For more specific principles for calculation of a moving speed, reference is to be made, for example, to Japanese Patent Laying-Open No. 2003-32167.

When downlink user data control unit 6 receives downlink user data from network communication unit 11, resource determination unit 37 determines at least a part within any downlink subframe as a first resource from which downlink user data to a wireless terminal is transmitted. In addition, resource determination unit 37 determines a part of an UpPTS (uplink part) within a switch subframe as a second resource for the wireless terminal to periodically transmit an SRS.

When a re-sending request signal is received from a wireless terminal and when a moving speed of wireless terminal 51 is equal to or greater than a prescribed value R, resource determination unit 37 determines a third resource as follows. When a moving speed of wireless terminal 51 is equal to or greater than prescribed value R and when a cumulative total of received re-sending request signals is equal to or greater than a threshold value TH1, resource determination unit 37 determines at least a part within any uplink subframe UL as a third resource for the wireless terminal to transmit uplink user data including a DRS. In addition, when a re-sending request signal is received from the wireless terminal, when a moving speed of wireless terminal 51 is smaller than prescribed value R, and when a cumulative total of received re-sending request signals is equal to or greater than a threshold value TH2, resource determination unit 37 determines at least a part within any uplink subframe UL as a third resource for the wireless terminal to transmit uplink user data including a DRS. Here, threshold value TH1 is a value smaller than threshold value TH2. Definition as such is made in consideration of the fact that a state of a transmission path varies in the case where a moving speed of a wireless terminal is fast and therefore reliability of an old SRS is low.

Transmission path state estimation unit 39 estimates a state of a transmission path based on an SRS or a DRS. Transmission path state estimation unit 39 estimates a state of a transmission path to the wireless terminal based on the received, most recent SRS in an SRS transmission section.

When a re-sending request signal is received after transmission of an SRS is stopped and when a moving speed of wireless terminal 51 is equal to or greater than prescribed value R, transmission path state estimation unit 39 estimates a state of the transmission path as follows. When a cumulative total of received re-sending request signals is smaller than threshold value TH1, transmission path state estimation unit 39 estimates a state of the transmission path to wireless terminal 51 based on the last received SRS. When a cumulative total of received re-sending request signals is equal to or greater than threshold value TH1, transmission path state estimation unit 39 estimates a state of the transmission path to wireless terminal 51 based on a DRS included in uplink user data received from wireless terminal 51.

When a re-sending request signal is received after transmission of an SRS is stopped and when a moving speed of wireless terminal 51 is smaller than prescribed value R, transmission path state estimation unit 39 estimates a state of the transmission path as follows. When a cumulative total of received re-sending request signals is smaller than threshold value TH2, transmission path state estimation unit 39 estimates a state of the transmission path to wireless terminal 51 based on the last received SRS. When a cumulative total of received re-sending request signals is equal to or greater than threshold value TH2, transmission path state estimation unit 39 estimates a state of the transmission path to wireless terminal 51 based on a DRS included in uplink user data received from wireless terminal 51.

(Operation Procedure)

Figure 14:
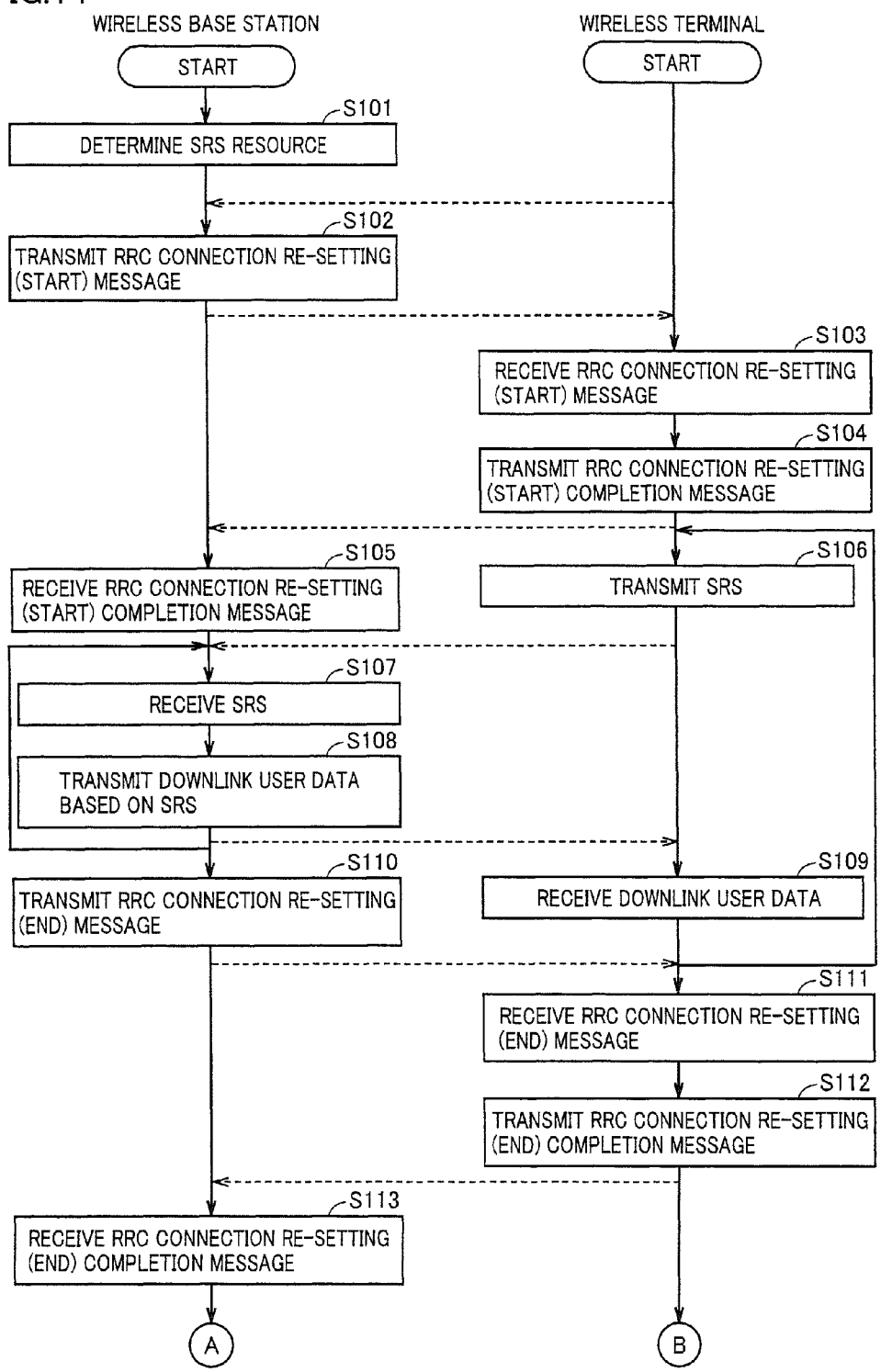
FIG. 14 is a flowchart showing an operation procedure in the wireless communication system in the third embodiment.
Figure 15:
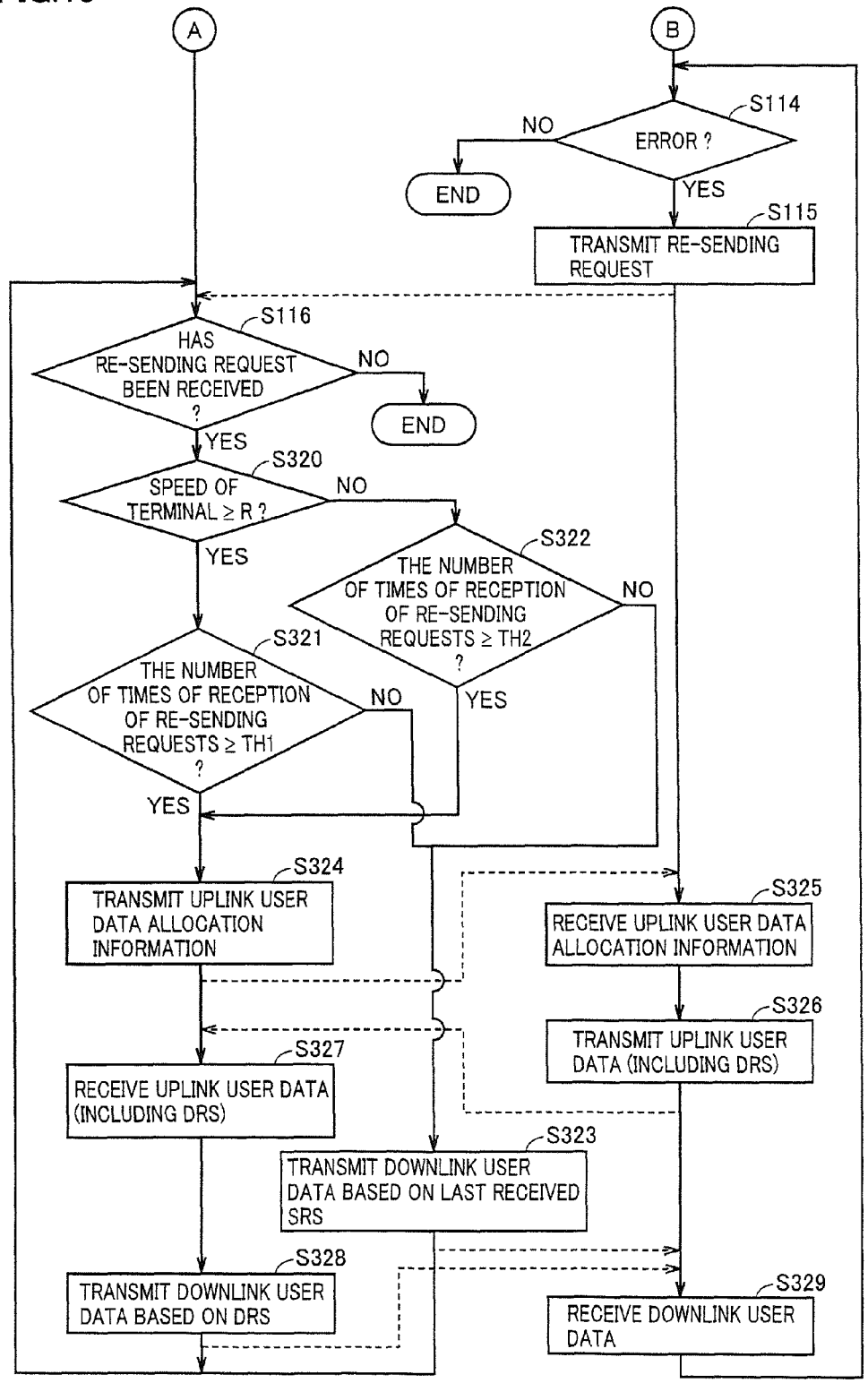
FIG. 15 is a flowchart showing the operation procedure in the wireless communication system in the third embodiment.

FIGS. 14 and 15 are flowcharts showing an operation procedure in the wireless communication system in the third embodiment.

Referring to FIGS. 14 and 15, initially, resource determination unit 37 of wireless base station 31 determines any resource within an UpPTS in switch subframe S as a second resource for wireless terminal 51 to periodically transmit an SRS (step S101).

Then, resource notification unit 8 of wireless base station 31 transmits an RRC connection re-setting (indication start of transmission) message representing the determined second resource (step S101).

Then, sounding signal control unit 58 of wireless terminal 51 receives the RRC connection re-setting (indicating start of transmission) message (step S103).

Then, sounding signal control unit 58 of wireless terminal 51 transmits an RRC connection re-setting (indicating start of transmission) completion message (step S104).

Then, resource notification unit 8 of wireless base station 31 receives the RRC connection re-setting (indicating start of transmission) completion message (step S105).

Then, sounding signal control unit 58 of wireless terminal 51 transmits an SRS by using the second resource of which notification has been given (step S106).

Then, SRS control unit 13 of wireless base station 31 receives the SRS (step S107).

Then, transmission path state estimation unit 39 of wireless base station 31 estimates a state of a transmission path to wireless terminal 51 based on the SRS received in step S107. Resource determination unit 37 of wireless base station 31 determines at least a part within any downlink subframe DL as a first resource for transmitting downlink user data to wireless terminal 51. Transmission unit 4 of wireless base station 31 forms directivity of the plurality of antennas 2, 3 based on the estimated state of the transmission path and transmits through the first resource, the downlink user data and downlink user allocation information indicating that this first resource includes the downlink user data (step S108).

Then, reception unit 55 of wireless terminal 51 receives the downlink user data through the plurality of antennas 52, 53 (step S109).

Thereafter, processing in steps S106 to S109 is repeated.

Then, resource notification unit 8 of wireless base station 31 transmits an RRC connection re-setting (indicating end of transmission) message (step S110).

Then, sounding signal control unit 58 of wireless terminal 51 receives the RRC connection re-setting (indicating end of transmission) message (step S111).

Then, sounding signal control unit 58 of wireless terminal 51 transmits an RRC connection re-setting (indicating end of transmission) completion message (step S112).

Then, resource notification unit 8 of wireless base station 31 receives the RRC connection re-setting (indicating end of transmission) completion message (step S113).

When an error is detected in the received downlink user data (YES in step S114), user data control unit 57 of wireless terminal 51 transmits a re-sending request signal (NACK: Negative ACKnowledgements) based on HARQ (step S115).

Then, when a re-sending request signal is received (YES in step S116), when a moving speed of wireless terminal 51 calculated by terminal speed identification unit 32 is equal to or greater than prescribed value R (YES in step S320), and when the cumulative number of times of reception of re-sending request signals is smaller than threshold value TH1 (NO in step S321), or when a moving speed of wireless terminal 51 is smaller than prescribed value R (NO in step S320) and when the cumulative number of times of reception of re-sending request signals is smaller than threshold value TH2 (NO in step S322), transmission path state estimation unit 39 of wireless base station 31 estimates a state of the transmission path to wireless terminal 51 based on the last received SRS. Resource determination unit 37 of wireless base station 31 determines at least a part within any downlink subframe DL as a first resource for transmitting downlink user data to wireless terminal 51. Transmission unit 4 of wireless base station 31 forms directivity of the plurality of antennas 2, 3 based on the estimated state of the transmission path and transmits through the first resource, the downlink user data of which re-sending has been requested and downlink user allocation information indicating that this first resource includes the downlink user data (step S323).

On the other hand, when a re-sending request signal is received (YES in step S116), when a moving speed of wireless terminal 51 is equal to or greater than prescribed value R (YES in step S320), and when the cumulative number of times of reception of the re-sending request signals is equal to or greater than threshold value TH1 (YES in step S321), or when a moving speed of wireless terminal 51 is smaller than prescribed value R (NO in step S320) and when the cumulative number of times of reception of re-sending request signals is equal to or greater than threshold value TH2 (YES instep S322), resource determination unit 37 of wireless base station 31 determines at least a part within any uplink subframe UL as a third resource for wireless terminal 51 to transmit uplink user data including a DRS. Resource notification unit 8 of wireless base station 31 transmits uplink user data allocation information representing the determined third resource (step S324).

Then, user data control unit 57 of wireless terminal 51 receives the uplink user data allocation information representing the third resource (step S325).

Then, user data control unit 57 of wireless terminal 51 transmits the uplink user data including the DRS by using the third resource of which notification has been given in step S325 (step S326).

Then, uplink user data control unit 10 of wireless base station 31 receives the uplink user data including the DRS (step S327).

Then, transmission path state estimation unit 39 of wireless base station 31 estimates a state of a transmission path to wireless terminal 51 based on the DRS received in step S327. Resource determination unit 37 of wireless base station 31 determines at least a part within any downlink subframe DL as a first resource for downlink user data to wireless terminal 51. Transmission unit 4 of wireless base station 31 forms directivity of the plurality of antennas 2, 3 based on the estimated state of the transmission path and transmits through the first resource, the downlink user data of which re-sending has been requested and downlink user allocation information indicating that this first resource includes the downlink user data (step S328).

Then, reception unit 55 of wireless terminal 51 receives the downlink user data through the plurality of antennas 52, 53 and the process returns to step S114 (step S329).

As described above, according to the wireless communication system in the third embodiment, when a re-sending request is generated in a wireless terminal after transmission of an SRS ends, at first, a wireless base station uses the last received SRS because it expresses to some extent a current status of a transmission path. Thereafter, since the last received SRS will no longer express a current status of the transmission path, the wireless base station uses a DRS included in uplink user data, which is different from the SRS. Thus, as in the second embodiment, a state of a transmission path can quickly and accurately be estimated and downlink user data having directivity can quickly an accurately be re-sent. Furthermore, by varying a period during which the last received SRS is used in accordance with a moving speed of a wireless terminal, variation in reliability of the last received SRS in accordance with a moving speed of the wireless terminal can also be addressed.

(Variation)

The present invention is not limited to the embodiment above, and also includes, for example, a variation as below.

(1) DRS

In the embodiment, it has been assumed that the wireless base station determines a third resource for a wireless terminal to transmit uplink user data including a DRS and notifies that wireless terminal of the third resource, however, the embodiment is not limited thereto. In the case where the wireless base station has already received uplink user data from that wireless terminal, the DRS included in the uplink user data can be used for estimation of a state of a transmission path, and therefore it is not necessary to newly determine a third resource.

(2) SRS

In the embodiment, the resource determination unit determines a part of an UpPTS (uplink part) within a switch subframe as a second resource for a wireless terminal to periodically transmit an SRS, however, the embodiment is not limited thereto. For example, the resource determination unit may determine the entire UpPTS (uplink part) within the switch subframe as the second resource for the wireless terminal to periodically transmit an SRS. Alternatively, the resource determination unit may determine a part within a switch subframe or of uplink subframe UL (for example, a last symbol) as the second resource for the wireless terminal to periodically transmit an SRS.

(3) Downlink User Data

Though FIGS. 5 and 9 show that the same downlink subframe is used for each half frame unit as a resource from which downlink user data is transmitted, this is by way of example. In FIGS. 5 and 9, a first resource may be allocated to any of a plurality of downlink subframes DL and a DwPTS in switch subframe S.

(4) Uplink User Data Allocation Information and Uplink User Data

Though uplink user data allocation information is transmitted in downlink subframe DL immediately following switch from an uplink in FIGS. 5, 7, 9, and 12, the embodiment is not limited as such. Any of a plurality of downlink subframes DL and a DwPTS in switch subframe S may be used for transmitting uplink user data allocation information.

In addition, any of a plurality of uplink subframes UL may be used for transmitting uplink user data based on uplink user data allocation information.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

Reference Signs List 1, 21, 31 wireless base station; 2, 3, 52, 53 antenna; 4, 54 transmission unit; 5, 55 reception unit; 6 downlink user data control unit; 7, 27, 37 resource determination unit; 8 resource notification unit; 9, 29, 39 transmission path state estimation unit; 10 uplink user data control unit; 11 network communication unit; 12 network; 13 SRS control unit; 32 terminal speed identification unit; 51 wireless terminal; 57 user data control unit; and 58 sounding signal control unit.

The invention claimed is:

1. A wireless base station, comprising:
a resource determiner that determines at least a part within any downlink subframe as a first resource for transmitting downlink user data to a wireless terminal and determines at least a part of an uplink part within a switch subframe or a part of an uplink subframe as a second resource for said wireless terminal to periodically transmit a sounding reference signal;
a resource notifier that notifies said wireless terminal of said second resource;
a transmission path state estimator that estimates a state of a transmission path to said wireless terminal based on a reference signal included in uplink user data received from said wireless terminal when a re-sending request is received after transmission of said sounding reference signal is stopped; and
a transmitter that forms directivity of a plurality of antennas based on the estimated state of the transmission path and transmits said downlink user data through said first resource.

2. The wireless base station according to claim 1, wherein said transmission path state estimator estimates a state of the transmission path to said wireless terminal based on a received, most recent sounding reference signal in a transmission section of said sounding reference signal.

3. The wireless base station according to claim 1, wherein when said re-sending request is received, said resource determiner determines at least a part within any uplink subframe as a third resource for said wireless terminal to transmit uplink user data including said reference signal, and said resource notifier notifies said wireless terminal of determined said third resource.

4. The wireless base station according to claim 3, wherein said wireless base station is a wireless base station in a communication system adapted to an LTE (Long Term Evolution) scheme, and
said resource determiner determines said first resource, said second resource, and said third resource in accordance with a frame configuration of which Uplink-downlink configuration is "1".

5. The wireless base station according to claim 1, wherein when said re-sending request is received after transmission of said sounding reference signal is stopped and when a cumulative total of received said re-sending requests is smaller than a first value, said transmission path state estimator estimates a state of the transmission path to said wireless terminal based on last received said sounding reference signal, and when a cumulative total of received said re-sending requests is equal to or greater than said first value, said transmission path state estimator estimates a state of the transmission path to said wireless terminal based on the reference signal included in the uplink user data received from said wireless terminal.

6. The wireless base station according to claim 5, further comprising a terminal speed controller which controls a moving speed of said wireless terminal, wherein
when a speed of said wireless terminal is equal to or greater than a prescribed value, said transmission path state estimator estimates a state of said transmission path with said first value being decreased as compared with a case where a speed of said wireless terminal is smaller than said prescribed value.

7. The wireless base station according to claim 1, wherein said wireless base station is a wireless base station in a communication system adapted to an LTE (Long Term Evolution) scheme, and
said uplink part is an UpPTS (Uplink Pilot Timeslot).

8. A wireless base station, comprising:
a resource determiner that determines at least a part within any downlink subframe as a first resource that transmits downlink user data to a wireless terminal and determines at least a part of an uplink part within a switch subframe or a part of an uplink subframe as a second resource for said wireless terminal to periodically transmit a sounding reference signal;

a resource notifier that notifies said wireless terminal of determined said second resource;

a transmission path state estimator which estimates a state of a transmission path to said wireless terminal based on a received, most recent sounding reference signal in a transmission section of said sounding reference signal, estimates a state of a transmission path to said wireless terminal based on last received said sounding reference signal when a re-sending request is received after transmission of said sounding reference signal is stopped and when a cumulative total of received said re-sending requests is smaller than a first value, and estimates a state of a transmission path to said wireless terminal based on a reference signal included in uplink user data received from said wireless terminal when a cumulative total of received said re-sending requests is equal to or greater than said first value; and a transmitter that forms directivity of a plurality of antennas based on estimated said state of the transmission path and transmits said downlink user data through said first resource.

9. The wireless base station according to claim 8, wherein when said re-sending request is received and when the cumulative total of said received re-sending requests is equal to or great than said first value, said resource determiner determines at least a part within any uplink subframe as a third resource for said wireless terminal to transmit uplink user data including said reference signal, and said resource notifier notifies said wireless terminal of determined said third resource.

10. The wireless base station according to claim 9, wherein said wireless base station is a wireless base station in a communication system adapted to an LTE (Long Term Evolution) scheme, and said resource determiner determines said first resource, said second resource, and said third resource in accordance with a frame configuration of which Uplink-downlink configuration is "1".

11. The wireless base station according to claim 8, further comprising a terminal speed controller which controls a moving speed of said wireless terminal, wherein when a speed of said wireless terminal is equal to or greater than a prescribed value, said transmission path state estimator estimates a state of said transmission path with said first value being decreased as compared with a case where a speed of said wireless terminal is smaller than said prescribed value.

12. The wireless base station according to claim 8, wherein said wireless base station is a wireless base station in a communication system adapted to an LTE (Long Term Evolution) scheme, and said uplink part is an UpPTS (Uplink Pilot Timeslot).

13. A wireless communication method, comprising the steps of:

determining at least a part within any downlink subframe as a first resource for transmitting downlink user data to a wireless terminal and determining at least a part of an uplink part within a switch subframe or a part of an uplink subframe as a second resource for said wireless terminal to periodically transmit a sounding reference signal;

notifying said wireless terminal of determined said second resource;

estimating a state of a transmission path to said wireless terminal based on a reference signal included in uplink user data received from said wireless terminal when a re-sending request is received after transmission of said sounding reference signal is stopped; and forming directivity of a plurality of antennas based on estimated said state of the transmission path and transmitting said downlink user data through said first resource.

14. A wireless communication method, comprising the steps of:

determining at least a part within any downlink subframe as a first resource for transmitting downlink user data to a wireless terminal and determining at least a part of an uplink part within a switch subframe or a part of an uplink subframe as a second resource for said wireless terminal to periodically transmit a sounding reference signal;

notifying said wireless terminal of determined said second resource;

estimating a state of a transmission path to said wireless terminal based on a received, most recent sounding reference signal in a transmission section of said sounding reference signal;

estimating a state of a transmission path to said wireless terminal based on last received said sounding reference signal when a re-sending request is received after transmission of said sounding reference signal is stopped and when a cumulative total of received said re-sending requests is smaller than a first value;

estimating a state of a transmission path to said wireless terminal based on a reference signal included in uplink user data received from said wireless terminal when a re-sending request is received after transmission of said sounding reference signal is stopped and when a cumulative total of received said re-sending requests is equal to or greater than said first value; and forming directivity of a plurality of antennas based on estimated said state of the transmission path and transmitting said downlink user data through said first resource.

* * * * *